United States Patent [19]

Steigleder

[11] Patent Number: 4,661,239

[45] Date of Patent: Apr. 28, 1987

[54] MIDDLE DISTILLATE PRODUCING HYDROCRACKING PROCESS

[75] Inventor: Karl Z. Steigleder, Glen Ellyn, Ill.

[73] Assignee: UOP Inc., Des Plaines, Ill.

[21] Appl. No.: 882,556

[22] Filed: Jul. 7, 1986

Related U.S. Application Data

[63] Continuation-in-part of Ser. No. 751,158, Jul. 2, 1985.

[51] Int. Cl.$^4$ ............................................. C10G 47/20
[52] U.S. Cl. ................................................... 208/111
[58] Field of Search ......................... 208/111, 111 MC

[56] References Cited

U.S. PATENT DOCUMENTS

| | | | |
|---|---|---|---|
| 3,304,254 | 2/1967 | Eastwood et al. | 208/111 |
| 3,597,349 | 8/1971 | Bertolacini et al. | 208/111 |
| 3,764,520 | 10/1973 | Kimberlin, Jr. et al. | 208/111 |
| 3,804,747 | 4/1974 | Kimberlin, Jr. et al. | 208/111 |
| 3,830,724 | 8/1974 | Schutt | 208/111 |
| 3,864,283 | 2/1975 | Schutt | 208/111 |
| 3,894,940 | 7/1975 | Scherzer et al. | 208/111 |
| 3,925,195 | 12/1975 | Scherzer et al. | 208/135 |
| 3,949,059 | 4/1976 | Elliott, Jr. | 423/329 |
| 4,477,336 | 10/1984 | Scherzer | 208/111 |
| 4,534,853 | 8/1985 | Long et al. | 502/79 |
| 4,565,621 | 1/1986 | Ward | 208/111 |
| 4,576,711 | 3/1986 | Ward et al. | 208/111 |
| 4,588,496 | 5/1986 | Scherzer | 208/120 |
| 4,604,373 | 8/1986 | Clark | 502/68 |

*Primary Examiner*—Andrew H. Metz
*Assistant Examiner*—Anthony McFarlane
*Attorney, Agent, or Firm*—Thomas K. McBride; John F. Spears, Jr.; Thmas J. Filarski

[57] ABSTRACT

A process for the production of a middle distillate fraction comprising contacting a hydrocarbon feedstock at middle distillate production conditions with a catalyst composition comprising a first modified Y zeolite component and a second modified Y zeolite component in admixture with a refractory inorganic oxide matrix and hydrogenation metals. The first and second modified Y zeolites have an average unit cell size within the range of about 24.20 to 24.85 A and have a difference between their respective average unit cell sizes of at least 0.1 A.

15 Claims, No Drawings

MIDDLE DISTILLATE PRODUCING HYDROCRACKING PROCESS

CROSS REFERENCE TO RELATED APPLICATIONS

This is a continuation-in-part of prior co-pending application Ser. No. 751,158 filed July 2, 1985 pending.

BACKGROUND OF THE INVENTION

1. Field of the Invention

This invention is applicable to the field of catalytic hydrocarbon conversion. The invention relates to a novel catalyst for use in a hydrocracking process. More specifically, it relates to an improved hydrocracking catalyst which demonstrates unexpected and exceptional activity, selectivity and resistance to deactivation when employed in a hydrocracking process producing middle distillates from heavy gas oils and the like under hydrocracking conditions.

Many refineries today produce middle distillate products such as jet fuel and diesel fuel by hydrocracking a heavy gas oil charge stock. The charge stock usually has a boiling point in the range between about 650°–1050° F. The hydrocracking products are obtained by contacting the heavy oil at an elevated temperature and pressure in the presence of hydrogen with a suitable hydrocracking catalyst. The middle distillate fraction which is uncovered has a boiling range between about 300°–700° F. A main concern of refineries today is to increase middle distillate production via the hydrocracking process. By improving the catalytic properties of the catalyst employed in the hydrocracking process, middle distillate production can be increased.

Activity, selectivity and stability are the three main catalytic properties by which a hydrocracking catalyst is evaluated. Activity usually is determined by comparing the temperature at which various catalysts must be utilized under otherwise constant hydrocracking conditions with the same feedstocks and same conversion rate of products boiling below a specified temperature. The lower the activity temperature for a given catalyst, the more active the catalyst is for the specified process. Selectivity of hydrocracking catalysts is a measure of the yield of a desired product. Stability is a measure of how well a catalyst maintains its activity and selectivity over an extended period of time when treating a given hydrocarbon feedstock. Stability is generally measured in terms of the rate of change in temperature required per day to maintain a given conversion rate.

The goal of hydrocracking catalysis is to provide a catalyst with the highest possible activity, selectivity and stability. Catalysts employed in hydrocracking processes usually comprise a Group VIII metal component in combination with a Group VIB metal component, both of which are in intimate admixture with a support material. The activity, selectivity and stability of the catalysts vary widely when different supports are used. Support materials known to the hydrocracking art comprise porous refractory inorganic oxide materials such as amorphous silica alumina, alumina and the like, as well as crystalline aluminosilicate zeolites, such as zeolite-Y. Support materials consisting essentially of refractory oxides generally have relative poor activity, but high selectivity, while support materials comprising zeolites generally provide high activity, but low selectivity.

2. Object of the Invention

An object of the present invention, therefore, is to provide a hydrocracking catalyst having superior catalytic properties for hydrocracking hydrocarbons. More specifically, it is an object of this invention to provide a catalyst having superior activity, selectivity and stability for hydrocracking in comparison to prior art catalysts. Further, it is an object of this invention to provide a hydrocracking catalyst having superior catalytic properties for converting heavy gas oils to middle distillate products. Additionally, it is an object of this invention to provide a support or carrier material which may be useful in a hydrocracking process. It is also an object to provide a superior hydrocracking process for the conversion of heavy gas oils to middle distillate products. These and other objects and advantages of the present invention will become more apparent in view of the following description of the invention.

3. Description of the Prior Art

A number of patents disclose cracking catalysts comprising a mixture of zeolites dispersed in an inorganic oxide matrix.

U.S. Pat. No. 4,419,271 discloses a hydrocracking catalyst for use in the production of middle distillate oils comprising one or more hydrogenation components supported on a base containing a crystalline aluminosilicate zeolite and a dispersion of silica-alumina in an alumina matrix. Patentee teaches that a mixture of one or more crystalline aluminosilicates having cracking activity may be dispersed in the double matrix. Patentee, however, does not disclose any specific mixture of zeolites.

U.S. Pat. No. 4,287,048 discloses a hydrocracking catalyst comprising an ultra-stable Y-type zeolite and a small pore crystalline zeolite such as mordenite in an inorganic oxide matrix.

U.S. Pat. No. 4,137,152 discloses a cracking process utilizing a mixture of faujasite and mordenite.

U.S. Pat. No. 3,894,934 discloses catalytic cracking of hydrocarbons utilizing a large pore zeolite and a small pore zeolite such as zeolite ZSM-5 dispersed in a common matrix.

U.S. Pat. No. 3,702,886 discloses use of ZSM-5 zeolite alone or in combination with other materials such as zeolites or inert materials for catalytic cracking of hydrocarbons.

U.S. Pat. No. 3,804,747 discloses a hydrocarbon conversion process utilizing a mixture of zeolites X and Y.

U.S. Pat. No. 3,758,403 discloses a catalytic cracking composite comprising a large pore zeolite, such as zeolite Y, and a small bore zeolite, such as ZSM-5, in a siliceous matrix. The matrix may be active or inactive, such as silica-alumina or alumina. The use of the ZSM-5 type zeolite results in obtaining a fuel of increased octane number.

U.S. Pat. No. 3,769,202 discloses a combination catalyst comprising a mixture of two different zeolites, one having a pore size greater than 8 Angstroms and the other having a pore size of less than 7 Angstroms. The zeolites are mixed with an inorganic oxide matrix such as silica-alumina. The catalyst is suitable for cracking and hydrocracking of hydrocarbons.

U.S. Pat. No. 3,925,195 discloses a cracking process utilizing a catalyst comprising a mixture of rare earth hydrogen Y-type zeolite, and hydrogen or transition metal-exchanged mordenite, calcium-exchanged type A zeolite, or hydrogen-exchanged erionite and an amorphous matrix.

U.S. Pat. No. 3,764,520 discloses a catalyst comprising a mixture of two different zeolites, one having a pore size within the range of 6 to 15 Angstroms and the other having a pore size of less than 6 Angstroms in combination with an inorganic oxide support. The catalyst is useful for hydrocarbon conversion processes to give increased selectivity.

None of the above-mentioned patents, however, disclose a catalytic composition comprising a specific mixture of Y-type zeolites.

SUMMARY OF THE INVENTION

In accordance with the invention, there is provided a catalyst composition comprising, in combination, at least a first Y-type crystalline aluminosilicate zeolite component and a second Y-type crystalline aluminosilicate zeolite component in intimate admixture with a refractory inorganic oxide matrix wherein said first and second zeolites have an average unit cell size within the range of about 24.20 to about 24.85 Angstroms and wherein the difference between the average unit cell size of said first and second zeolites is at least 0.1 Angstroms.

In another embodiment, the present invention provides for a hydrocracking catalyst composition comprising, in combination, a hydrogenation component, at least a first Y-type crystalline aluminosilicate component and a second Y-type crystalline aluminosilicate component in intimate admixture with a refractory inorganic oxide matrix wherein said first and second zeolites have an average unit cell size within the range of about 24.20 to about 24.85 Angstroms and wherein the difference between the average unit cell size of said first and second zeolites is at least 0.1 Angstroms.

Furthermore, the invention provides for a catalytic hydrocracking process for the production of middle distillate oils boiling below 700° F. utilizing either of the above catalyst compositions.

DETAILED DESCRIPTION OF THE INVENTION

The catalyst composition of the present invention will comprise at least two Y-type zeolite components in combination with an inorganic matrix.

The prior art has taught that zeolitic catalysts may be made from either natural or synthetic zeolites and may be used for hydrocarbon conversion. Known zeolites include the natural zeolites faujasite, mordenite, erionite and chabazite, and synthetic zeolites A, L, S, T, X and Y. In general, zeolites are metal aluminosilicates having a crystalline structure such that a relatively large adsorption area is present inside each crystal. Zeolites consist basically of three-dimensional frameworks of $SiO_4$ and $AlO_4$ tetrahedra with the tetrahedra crosslinked by the sharing of oxygen atoms. The electrovalence of the tetrahedra containing aluminum is balanced by the inclusion of cations in the crystal, for example, metal ions, ammonium ions, amine complexes or hydrogen ions. The spaces in the pores may be occupied by water or other adsorbate molecules. Normally, the crystalline zeolites occur, or are prepared in the alkali metal form which is generally inactive for catalytic hydrocarbon cracking.

The present invention contemplates zeolite components having cracking activity. To produce a zeolite having cracking activity, the alkali metals are usually replaced with multivalent metal-containing cations, hydrogen ions, or hydrogen ion precursors (e.g. ammonium ion). This replacement of cations is generally accomplished by ion exchange, a method well known in the art wherein the zeolite in the sodium or other alkali metal form is contacted with an aqueous solution containing hydrogen ions, ammonium ions, rare earth ions, or other suitable cations. Replacing even a portion of the sodium ions produces a zeolite having some cracking activity, but reducing the alkali metal content to less than 5 wt. %, preferably to less than 1 wt. %, and most preferably to less than about 0.5 wt. % (calculated as the alkali metal oxides), results in a material having substantial cracking activity.

The Y-type zeolite is generally disclosed in U.S. Pat. No. 3,130,007, which is incorporated herein by reference. The crystals of zeolite Y are basically three-dimensional frameworks of $SiO_4$ and $AlO_4$ tetrahedrons crosslinked by the sharing of oxygen atoms. The electrovalence of each tetrahedron containing aluminum is balanced by the presence in the aluminosilicate framework of a cation such as an alkali metal ion. The void spaces in the framework are occupied by water molecules.

The chemical formula for zeolite Y expressed in terms of moles of oxides may be written as

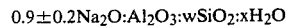

$$0.9 \pm 0.2 Na_2O:Al_2O_3:wSiO_2:xH_2O$$

wherein w is a value greater than 3 up to about 6 and x may be a value up to about 9.

The Y-type zeolite components utilized in the present invention may be modified by any known technique. Preferred are Y-type zeolites which have been hydrothermally treated at temperatures above 500° C. Hydrothermal treatment is described in Dwyer, J., *Zeolite Structure, Composition and Catalysts*, Chemistry and Industry, Issue No. 7, Apr. 2, 1984, herein incorporated by reference.

Regardless of the Y-type zeolite employed, the unit cell size of each of the zeolite components must be within the range of about 24.20 to 24.85 Angstroms. In a preferable embodiment, the composition will comprise a first and second zeolite component each having a unit cell size in the range of 24.20 to 24.35 Angstroms. The difference between the average unit cell size of the two zeolite components is at least 0.1 Angstroms. The weight ratio of the first to second zeolite component is about 0.1 to 10:1 and preferably 1.0:1.0. The first zeolite component may be present in an amount of about 1.0 to 20.0 wt. % and preferably 5.0 wt. %. The second zeolite component may be present in an amount of about 1.0 to 20.0 wt. % and preferably 5.0 wt. %.

The catalyst composition also comprises a refractory inorganic oxide matrix. The composite comprises between 2 and 98 wt. % of the oxide matrix and preferably between 5 and 95 wt. %. The matrix may comprise any known refractory inorganic oxide such as alumina, magnesia, silica, titania, zirconia and the like and combinations thereof.

A preferred matrix comprises silica-alumina or alumina. The most preferred matrix comprises a mixture of silica-alumina and alumina wherein said silica-alumina comprises between 5 and 95 wt. % of said matrix and the overall silica content is between about 1 to 75 wt. % of said matrix.

The silica-alumina support material is preferably a composite of alumina and silica. By way of specific examples, a satisfactory support or carrier material may comprise equimolar quantities of alumina and silica or 63% by weight of silica. In general, the support comprises from about 10 wt. % to about 90 wt. % alumina. The support may be formed by any of the numerous techniques which are rather well defined in the prior art relating thereto. Such techniques include the acid-treating of a natural clay, sand or earth, co-precipitation or successive precipitation from hydrosols. These techniques are frequently coupled with one or more activating treatments including hot oil aging, steaming, drying oxidizing, reducing, calcining, etc. The pore structure of the support or carrier commonly defined in terms of surface area, pore diameter and pore volume, may be developed to specified limits by any suitable means including aging the hydrosol and/or hydrogel under controlled acidic or basic conditions at ambient or elevated temperature, or by gelling the carrier at a critical pH or by treating the carrier with various inorganic or organic reagents. A catalyst, adaptable for utilization in the process of the present invention, will have a surface area of about 200 to 400 square meters per gram, a pore diameter of about 20 to about 300 Angstroms, a pore volume of about 0.10 to about 0.80 milliliters per gram, and apparent bulk density within the range of from about 0.50 to about 0.90 gram/cc.

The alumina support material may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina is referred to as Zeigler alumina and has been characterized in U.S. Pat Nos. 3,852,190 and 4,012,313 as a by-product from a Zeigler higher alcohol synthesis reaction as described in Zeigler's U.S. Pat. No. 2,892,858. A preferred alumina is presently available from the Conoco Chemical Division of Continental Oil Company under the trademark "Catapal". The material is an extremely high purity alpha-alumina monohydrate (boehmite) which, after calcination at a high temperature, has been shown to yield a high purity gamma-alumina.

It is understood that the precise physical and/or chemical characteristics of the carrier material are not considered to be limiting upon the scope of the present invention. The catalyst may, for example, exist in the form of pills, pellets, granules, broken fragments, spheres, or various special shapes, disposed as a fixed bed within a reaction zone, and the charge stock may be passed therethrough in the liquid, vapor or mixed phase, and in either upward or downward flow. Alternatively, the catalyst may be prepared in a suitable form for use in moving bed reaction zones in which the hydrocarbon charge stock and catalyst are passed either in countercurrent flow or in cocurrent flow, or in fluidized-solid processes in which the charge stock is passed upward through a turbulent bed of finely divided catalyst, or in the suspension process, in which the catalyst is slurried in the charge stock and the resulting mixture is conveyed into the reaction zone. The reaction products from any of the foregoing processes are separated from the catalyst, vented to atmospheric pressure, and fractionated to recover the various components thereof. The hydrogen and unconverted material are recycled as desired.

The catalyst particles may be prepared by any known method in the art including the well-known oil drop and extrusion methods. In the case of the oil drop method, catalyst particles may be prepared by first suspending the selected zeolite powders in a suitable sol. Active metal components may also be incorporated into the sol. The sol admixture may then be passed as droplets into an oil bath which is maintained at an elevated temperature and retained in the oil bath until the sol droplets set to gelled spheres. The spherical particles may then be withdrawn from the oil bath and thereafter aged in a suspending medium at an elevated temperature for a suitable time period. The spherical particles may then be dried and calcined. If an alumina or silica-alumina oxide matrix is desired, the oil drop method may be carried out in accordance with U.S. Pat. No. 2,620,314 or 3,003,972, respectively, the teachings of which are incorporated herein by reference.

A second suitable and more preferred method of preparing the catalyst composition of the present invention is to co-mull the selected zeolites with alumina and amorphous silica-alumina. Prior to mixing, the admixed components are preferably crushed to a powder form. Active metal components may also be incorporated in the admixture. After mulling, the admixture is extruded through a die having suitable openings such as circular openings so as to produce an extrudate material of cylindrical shape. The extrudate can be cut in ½ to ¼ inch lengths and then dried and calcined at elevated temperatures and conditions known in the art.

In addition to admixture before or during the oil drop or extrusion methods, hydrogenation components may be composited with the catalyst by impregnation after the selected zeolites and refractory inorganic oxide materials have been formed, dried and calcined. Impregnation of the hydrogenation component may be caried out in any manner known in the art including evaporative, dip and vacuum impregnation techniques. In general, the dried and calcined particles are contacted with one or more solutions which contain the desired hydrogenation components in dissolved form. After a suitable contact time, the composite particles are dried and calcined to produce finished catalyst particles.

Hydrogenation components contemplated are those catalytically active components selected from Group VIB and Group VIII metals and their compounds. Generally, the amount of the catalytically active components present in the final catalyst is small compared to the quantity of the other above-mentioned components combined therewith. The Group VIII component generally comprises about 0.1 to about 20% by weight, preferably about 1 to about 15% by weight of the final catalytic composite calculated on an elemental basis. The Group VIB component comprises about 0.05 to about 15% by weight, preferably about 0.5 to about 12% by weight of the final catalytic composite calculated on an elemental basis. The hydrogenation components contemplated contain metallic components from the group of molybdenum, tungsten, chromium, iron, cobalt, nickel, platinum, palladium, iridium, osmium, rhodium, rudinium and mixtures thereof.

When desired, a phosphorus component may also be incorporated into the catalyst. Phosphorus incorporation may be effected by either admixing the support materials with a phosphorus-containing compound prior to formation of the particles or including phosphoric acid in the impregnating solution. Usually phosphorus is present in the catalyst in the range of 1 to 50 wt. % and preferably 3 to 25wt. % calculated as $P_2O_5$.

In addition, boron may also be present in the catalytic composite. Boron may be incorporated into the composite in any elemental or compound form and in any of the above manners described. That is, it may be incorporated during the particle formation or boron may be present as boric acid in the impregnating solution. Boron may also be incorporated into the framework of one or both of the selected zeolites. In the latter instance, a modification of the Y-type zeolite occurs and a silica-alumina-boron-zeolite is formed.

The hydrogenation components which, if present, will most likely be in their oxide forms after calcination in air may be converted to their sulfide forms if desired by contact at elevated temperatures with a reducing atmosphere comprising hydrogen sulfide. The catalyst may be sulfided in situ by contact with a sulfur containing feedstock or it may be sulfided prior to contact with any feedstock by immediately after calcination exposing the composite to a reduced atmosphere.

The foregoing described catalysts are especially useful for hydrocracking to convert a hydrocarbon feedstock to a more valuable product of lower average boiling point and lower average molecular weight. Most preferably, the above-described catalysts are especially useful for the production of middle distillate fractions boiling in the range of about 300°–700° F. In addition, the above catalysts are also useful for hydrogenation reactions such as hydrodenitrification and hydrodesulfurization of hydrocarbons. Typical feedstocks that may be treated include all mineral and synthetic oils and fractions thereof. Thus, such feedstocks such as straight run gas oils, vacuum gas oils, atmospheric residue, deasphalted vacuum residue, coker distillates and cat cracker distillates and contemplated. Preferred feedstocks include gas oils having approximately a 50% by weight or greater of their components boiling above 700° F.

Reaction conditions are those customarily employed in the art for hydrocracking processes. Reaction temperatures are in the range of 200° F. to 1500° F., preferably between 600° F. and 1200° F. Reaction pressures are in the range of atmospheric to about 3,000 psig, preferably between 200 psig and 3000 psig. Contact times usually correspond to liquid hourly space velocities (LHSV) in the range of about 0.1 hr$^{-1}$ to 15 hr$^{-1}$, preferably between about 0.2 and 12 hr$^{-1}$. Hydrogen circulation rates are in the range of 1,000 to 50,000 standard cubic feet (scf) per barrel of charge, preferably between 2,000 and 30,000 scf per barrel of charge.

The following examples which are provided for illustrative purposes and are not to be construed as limiting the scope of the invention, present catalysts which have been found to possess superior catalytic properties with respect to activity, selectivity and stability in the conversion of gas oils to middle distillate products by hydrocracking.

EXAMPLE I

Modified Y-type zeolites are prepared by steaming a powdered zeolite with a unit cell size of about 24.56 Angstroms at 1000° to 1500° F. for 0.5 to 24 hours at atmospheric pressure. The unit cell size of the modified zeolite can be controlled by varying the steaming conditions. Table I shows three modified Y-zeolites with different unit cell sizes which were prepared in the above manner and their respective steaming conditions.

TABLE I

| Zeolite | Unit Cell Size | Steaming Conditions Time (Hr) | Temp. °F. | Press. |
|---|---|---|---|---|
| A | 24.25 | 12 | 1450 | Atmospheric |
| B | 24.30 | 2 | 1450 | " |
| C | 24.35 | 2 | 1350 | " |

EXAMPLE II

A catalyst composition was prepared by mixing a modified Y-zeolite from Example I, with a refractory oxide matrix admixture of silica-alumina and alumina in amounts selected to yield an extrudate containing 5 weight percent volatile free zeolite and 95 weight percent oxide matrix. The resulting mixture was extruded into approximately 1/16 inch × ½ inch cylinder lengths. The extruded material was dried and then air calcined at 650° C. for 2 hours. The calcined particles were then evaporatively co-impregnated with an aqueous solution of ammonia metatungstate and nickel nitrate (Ni(NO$_3$)$_2$.6H$_2$O) present in amounts sufficient to produce a finished catalyst containing 1.0 wt. % elemental nickel and 10.0 wt. % elemental tungsten. The impregnated catalyst was then calcined for 45 minutes at 650° F. and then for 90 minutes at 1100° F. Three catalyst compositions were prepared in the above manner, each containing one of the three modified Y-zeolites prepared in Example I. Catalysts No. 1, 2 and 3 contained 5 wt. % of zeolites A, B and C of Example I and 95 wt. % oxide matrix, respectively. Catalyst No. 4 contained 10 wt. % of zeolite B of Example I and 90 wt. % oxide matrix. The pertinent properties of Catalysts No. 1–4 are listed in Table II.

TABLE II

| | Catalyst No. | | | | |
|---|---|---|---|---|---|
| | 1 | 2 | 3 | 4 | 5 |
| Base Composition Wt. % VF | | | | | |
| Zeolite | 5 | 5 | 5 | 10 | 10 |
| Oxide Matrix | 95 | 95 | 95 | 90 | 90 |
| Catalyst Composition Wt. % VF | | | | | |
| Ni | 1.0 | 1.0 | 1.0 | 1.0 | 1.0 |
| W | 10.0 | 10.0 | 10.0 | 10.0 | 10.0 |
| Zeolite Characteristics | | | | | |
| Zeolite (from Example I) | A | B | C | B | A,C |
| Unit Cell Size, A | 24.25 | 24.30 | 24.35 | 24.30 | 24.30 (Average) |

EXAMPLE III

A catalyst composition of the present invention was prepared by first mixing equal portions of Zeolite A and Zeolite C from Example I. The zeolite admixture was then mixed with a refractory oxide admixture identical to that of Catalyst No. 4 in amounts selected to yield an extrudate containing 10 wt. % total zeolite and 90 wt. % oxide matrix. The resulting mixture was then extruded, calcined and impregnated in exactly the same manner as described in Example II. The pertinent properties of this catalyst No. 5 are also given in Table II. It is important to note that, since equal portions of Zeolite A (24.25 A unit cell) and Zeolite C (24.35 A unit cell) were mixed together, the average unit cell size of the zeolite admixture was 24.30 A.

EXAMPLE IV

Each of the foregoing catalysts were tested for activity according to the following method:

A preheated vacuum gas oil having the chemical and physical properties shown in Table III was passed on a once-through basis through an isothermal reactor containing 75 cc of catalyst particles mixed with about 29 cc of 60 to 80 mesh quartz. The operating parameters were 2000 psig, 1.0 LHSV, a hydrogen recycle flow of 10,000 scf/bbl with 90-95% purity and a run length of approximately 4 days. The reaction temperature was adjusted to provide 70 wt. % conversion to products boiling at 700° F. or less. The conversion percent is calculated from a liquid chromatograph boiling range analysis of the product.

TABLE III

| Vacuum Gas Oil Properties | | | |
|---|---|---|---|
| Specific Gravity @ 60° F. | 0.9248 | Distillation, °C. | |
| Gravity °API @ 60° F. | 21.5 | IPB | 280 |
| Pour Point, °F. | 80 | 5/10% | 340/372 |
| Analine Point, °F. | 167.0 | 20/30 | 398/419 |
| Sulfur (LECO), wt. % | 2.24 | 40/50 | 439/455 |
| Nitrogen (Kjeldahl), ppm | 1100 | 60/70 | 473/490 |
| Carbon, wt. % | 85.82 | 80/90 | 514/544 |
| Hydrogen, wt. % | 11.64 | EP | 582 |
| Bromine No. | 5.0 | % Rec. | 99.0 |
| Viscosity, @ 210° F., CST | 6.954 | | |
| Conradson Carbon, wt. % | 0.42 | | |

The results of the above test are compiled in Table IV. The data indicates that Catalyst No. 5 (24.30 A average cell size, 10 wt. % zeolite) has yield performance identical to Catalyst No. 2 (24.30 A cell size, 5 wt. % zeolite), but unexpectedly is 12° F. more active. In comparison to Catalyst No. 4 (24.30 A cell size, 10 wt. % zeolite), Catalyst No. 5 is unexpectedly 6° F. more active and gives a 1.9 wt. % increase in selectivity for 300°-700° F. product.

TABLE IV

| | Catalyst No. | | | | |
|---|---|---|---|---|---|
| | 1 | 2 | 3 | 4 | 5 |
| Activity, °F. | 794 | 782 | 774.5 | 776 | 770 |
| 300-700° F. Yield, Wt. % | 62.4 | 60.9 | 56.9 | 59.0 | 60.9 |
| Unit Cell Size, A | 24.25 | 24.30 | 24.35 | 24.30 | 24.30 (Average) |
| Conversion, wt. % | 70 | 70 | 70 | 70 | 70 |
| Wt. % Zeolite | 5 | 5 | 5 | 10 | 10 |

I claim as my invention:

1. In a process for hydrocracking a hydrocarbon feedstock to middle distillate fractions boiling in the range of about 300° F. to 700° F. comprising contacting said feedstock at hydrocracking conditions with a catalyst composition comprising a mixture of a first hydrothermally treated Y zeolite component and a second hydrothermally treated Y zeolite component in intimate admixture with a refractory inorganic oxide matrix wherein the unit cell size of the first and second Y zeolite components ranges from about 24.20 to 24.35 Angstroms and the difference between the unit cell size of the first and second Y zeolite components is at least 0.1 Angstrom.

2. The process of claim 1 wherein said hydrocracking conditions comprise a temperature in the range of about 200° F. to 1500° F., a pressure in the range of atmospheric to about 3000 psig and a liquid hourly space velocity in the range of about 0.1 to 15 hr$^{-1}$.

3. The process of claim 1 wherein said composition comprises a refractory inorganic oxide matrix selected from the group consisting of alumina, magnesia, silica, titania, zirconia silica-alumina and mixtures thereof.

4. The process of claim 1 wherein said refractory inorganic oxide matrix comprises alumina.

5. The process of claim 1 wherein said refractory inorganic oxide matrix comprises silica-alumina.

6. The process of claim 1 wherein said composition comprises a refractory inorganic oxide matrix comprising an admixture of silica-alumina and alumina.

7. The process of claim 6 wherein said catalyst composition comprises between 1 and 75 wt. % silica.

8. The process of claim 6 wherein said catalyst composition comprises between 5 and 95 wt. % silica-alumina.

9. The process of claim 1 wherein said catalyst composition comprises a weight ratio of said first hydrothermally Y zeolite to said second hydrothermally Y zeolite in the range of from about 0.1:1 to 10:1.

10. The process of claim 16 wherein said first hydrothermally treated Y zeolite has a unit cell size of about 24.25 A.

11. The process of claim 16 wherein said second hydrothermally treated Y zeolite has a unit cell size of about 24.35 A.

12. The process of claim 16 wherein said first hydrothermally treated Y zeolite is present in an amount of about 1.0 to 20.0 wt. %.

13. The process of claim 16 wherein said second hydrothermally treated Y zeolite is present in an amount of about 1.0 to 20.0 wt. %.

14. The process of claim 16 wherein said catalyst composition contains hydrogenation metals selected from the group consisting of Group VIB and Group VIII metals.

15. The process of claim 14 wherein said catalyst composition contains nickel, tungsten, or combinations thereof.

* * * * *